United States Patent
Jiang et al.

(10) Patent No.: US 8,447,839 B2
(45) Date of Patent: May 21, 2013

(54) THREE-LAYER WEB MANAGEMENT PROTOCOL DEVICE EMULATION

(75) Inventors: XueYin Jiang, Shanghai (CN); Jingcun Wang, Shanghai (CN); Lei Zhao, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 304 days.

(21) Appl. No.: 12/871,880

(22) Filed: Aug. 30, 2010

(65) Prior Publication Data

US 2012/0054828 A1     Mar. 1, 2012

(51) Int. Cl.
*G06F 15/16*     (2006.01)
*G06F 9/455*     (2006.01)

(52) U.S. Cl.
USPC ............................ 709/219; 709/218; 703/23

(58) Field of Classification Search
USPC .............................. 709/217–232; 703/21–23
See application file for complete search history.

(56) References Cited

U.S. PATENT DOCUMENTS

| | | | | |
|---|---|---|---|---|
| 7,047,561 | B1 * | 5/2006 | Lee .................................. | 726/12 |
| 7,484,226 | B2 * | 1/2009 | Brooks et al. .................. | 719/330 |
| 7,694,140 | B1 * | 4/2010 | Sachenko et al. ............. | 713/170 |
| 7,698,398 | B1 | 4/2010 | Lai | |
| 8,060,074 | B2 * | 11/2011 | Danford et al. ............... | 455/419 |
| 2008/0109545 | A1 | 5/2008 | Shah | |

OTHER PUBLICATIONS

Balasooriya, et al., "A Middleware Architecture for Enhancing Web Services Infrastructure for Distributed Coordination of Workflows", Retrieved << http://ieeexplore.ieee.org/stamp/stamp.jsp?tp=&arnumber=4578484 >>, IEEE International Conference on Services Computing, (SCC 2008), Jul. 8-11, 2008, pp. 370-377.

Lu, et al., "WS-M4: A Novel WS-Management-based System Resource Management Middleware Model and Scheme", Retrieved << http://ieeexplore.ieee.org/stamp/stamp.jsp?tp=&arnumber=4662853 >>, GCC, Proceedings of the 2008 Seventh International Conference on Grid and Cooperative Computing, Oct. 24-26, 2008, pp. 124-132.

"Unified Manageability Architecture", Retrieved << http://www.dell.com/downloads/global/corporate/media/dell_unified.pdf?c=jm&l=en&s=gen >>, Oct. 30, 2006, pp. 1-40.

"Standards for Automated Resource Management in the Computing Environment", Retrieved << http://xml.coverpages.org/computingResourceManagement.html#ws-management >>, Retrieved Date: Apr. 29, 2010, pp. 32.

Driscoll, Dan., "Building WSDXML sections", Retrieved << http://blogs.msdn.com/dandris/default.aspx >>, Aug. 11, 2009, pp. 12.

\* cited by examiner

*Primary Examiner* — Yasin Barqadle

(57) ABSTRACT

A three-layer management protocol device emulator and method that emulates numerous Web management protocol devices using a single virtual machine. A client on a network believes that there are a large number of Web management protocol devices on the network. Embodiments of the emulator and method use a three-layer multiple-endpoint model. A proxy layer is used to emulate multiple devices by building an endpoint pool containing a large number of endpoint pairs corresponding to the emulated devices. The presentation layer is used to specifically translate and parse the Web management protocol, and the logic layer represents the logic for a specific Web management protocol device being emulated. Embodiments of the emulator and method receive a request from a client on the network, use the proxy layer, presentation layer and logic layer to process the request and obtain a response, and then send the response back to the requesting client.

20 Claims, 9 Drawing Sheets

THREE-LAYER WEB MANAGEMENT PROTOCOL DEVICE EMULATION

BACKGROUND

A Web management protocol is a protocol for the management of servers, devices, applications, and a variety of Web services. One type of Web management protocol is called Web Services-Management (or WS-Management). The WS-Management protocol is a standard that was published in 2005 by a group of companies to ensure access and management of devices that comply with this standard regardless of their software and hardware infrastructure. There are an increasing number of devices, servers, software products and even other standards that support the WS-Management protocol.

In order to be viable a WS-Management software product needs to support and manage a wide variety of devices and systems. For example, some WS-Management software products support more than 100,000 different WS-Management devices. One difficulty, however, is that whenever a new WS-Management software product is released it is desirable that it be verified on each of these devices. This can be an enormous and expensive task requiring the use of tens of thousands or even more physical devices to build a verification environment in which to verify that the software product is compatible with each device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the three-layer management protocol device emulator and method are capable of emulating thousands of Web management protocol devices on a virtual machine. While embodiments of the emulator and method use a single virtual machine on a network, it seems to the software product being tested that there are hundreds and thousands of Web management protocol devices on the network. In some embodiments the Web management protocol used is the Web Services-Management. Embodiments of the three-layer management protocol device emulator and method use a three-layer multiple-endpoint model to provide large-scale emulation of Web management protocol devices. This allows a single emulator to emulate multiple instances of Web management protocol devices.

The three-layer multiple-endpoint model used by embodiments of the emulator and method contains three layers: (1) a proxy layer; (2) a presentation layer; and (3) a logic layer. Embodiments of the proxy layer interface with the Web management protocol devices or clients on the network. Embodiments of the proxy layer emulate multiple devices by building an endpoint pool containing a large number of endpoint corresponding to emulated devices. In some embodiments the endpoint pool contains Internet Protocol (IP) addresses and host names. This makes it appear to a client as if there are hundreds if not thousands of devices available on the network. Embodiments of the presentation layer are used to specifically parse the Web management protocol. Embodiments of the logic layer represent logic for a specific Web management protocol device.

Embodiments of the emulator and method allow large-scale verification for any software product that supports a Web management protocol (such as the WS-Management standard) in a cost-efficient and highly-manageable manner. This facilitates tremendous hardware and power savings as well as an improvement in the quality of a software product being verified. Moreover embodiments of the emulator and method allow application to virtually any kind of WS-Management device by simply replacing the logic layer of the model to match the logic of the WS-Management device being emulated.

Embodiments of the emulator and method receive a request from a client on the network at the proxy layer. The proxy layer then uses the endpoint pool to match up the client to a target device being emulated. The request and the target device data then are sent to the presentation layer which parses the request using the Web management protocol to obtain parsing results. The logic layer processes the parsing results and obtains a result. The result is sent back to the presentation layer which generates a response to the request based on the result. The response then is sent to the proxy layer which uses the endpoint pool to send the response back to the client that originally sent the request.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of the three-layer management protocol device emulator and method reference is made to the accompanying drawings, which form a part thereof, and in which is shown by way of illustration a specific example whereby embodiments of the three-layer management protocol device emulator and method may be practiced. It is to be understood that other embodiments may be utilized and structural changes may be made without departing from the scope of the claimed subject matter.

I. System Overview

Figure 1:
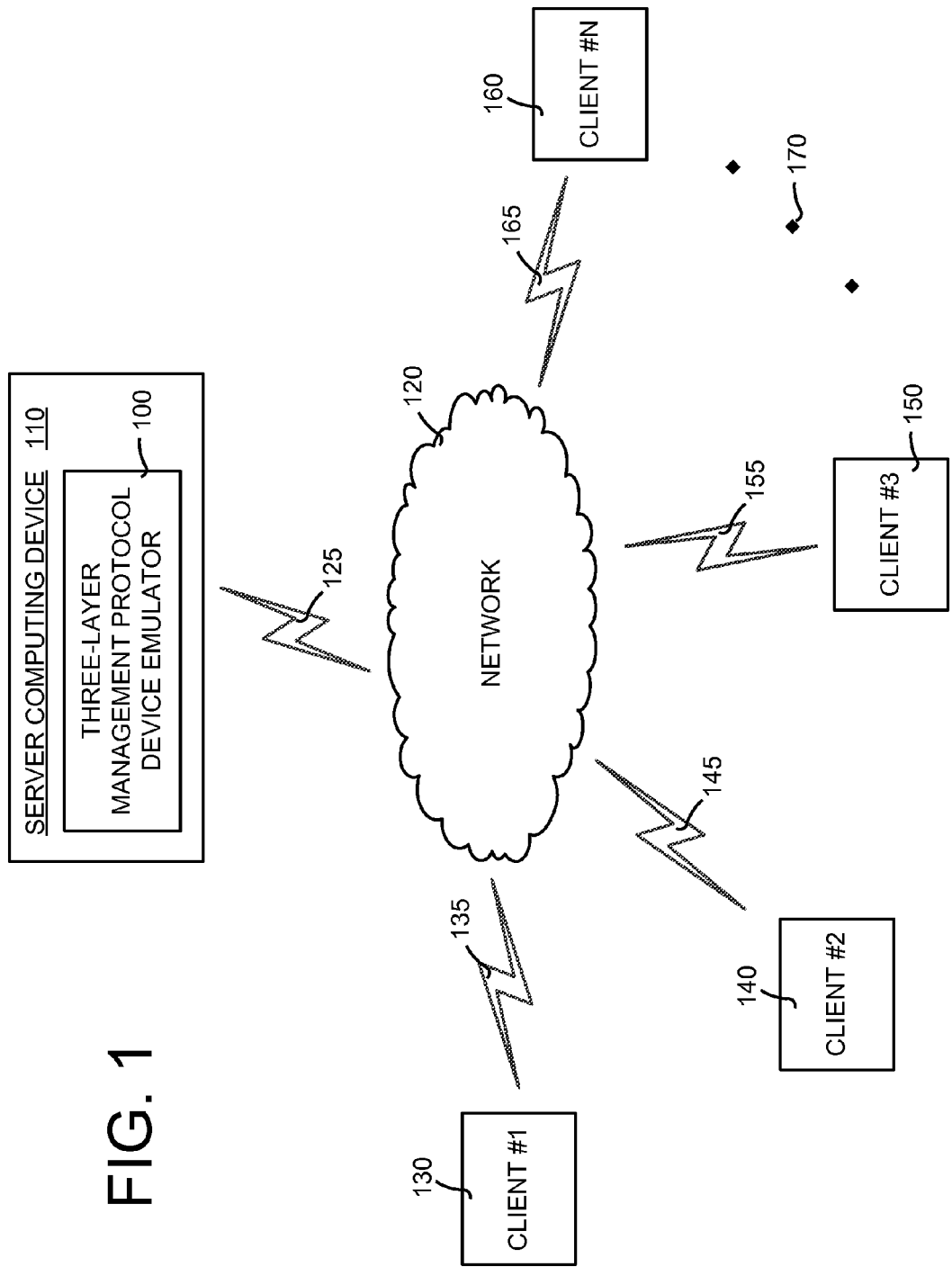
FIG. 1 is a block diagram illustrating a general overview of embodiments of a three-layer management protocol device emulator and method implemented on a computing device.

FIG. 1 is a block diagram illustrating a general overview of embodiments of a three-layer management protocol device emulator 100 and method implemented on a computing device 110. In general, embodiments of the three-layer management protocol device emulator 100 and method use a three-layer multiple-endpoint model to emulate Web management protocol devices on a large scale. Embodiments of the three-layer management protocol device emulator 100 and method communicate through a network 120 with client devices.

In particular, as shown in FIG. 1, Client #1 130 communicates through a first communication link 135 and the network 120 with embodiments of the three-layer management protocol device emulator 100 and method. Similarly, Client #140 communicates through a second communication link 145, Client #3 150 communicates through a third communication link 155, and so forth until finally Client #N 160 communicates through an Nth communication link 165 with embodiments of the three-layer management protocol device emulator 100 and method. The ellipses 170 in FIG. 1 denote that there may be any number of clients that are not shown. Moreover, it should be noted that although only four clients are shown in FIG. 1, typically N will be a large number (even in the tens of thousands).

Figure 2:
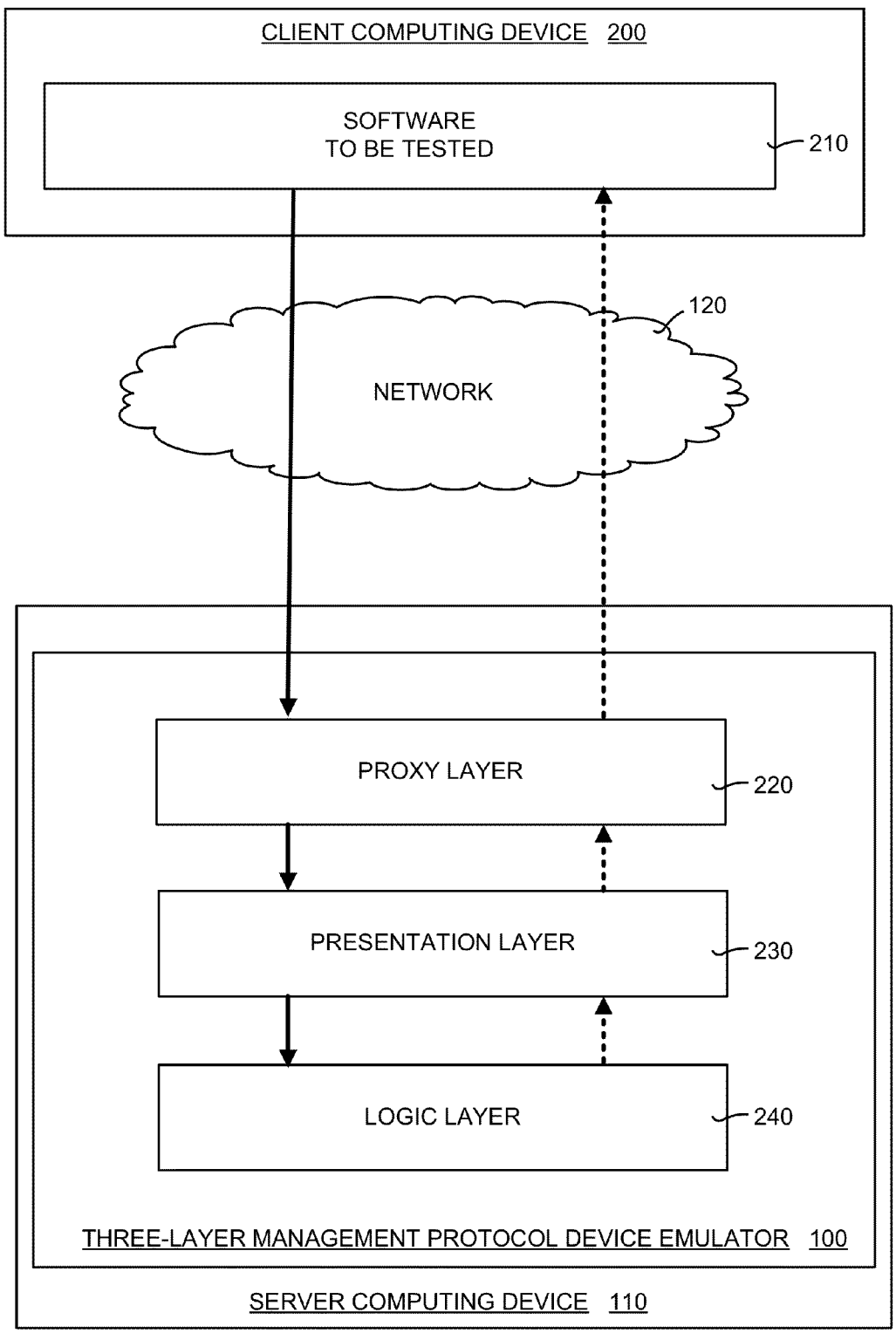
FIG. 2 is a block diagram illustrating details of interaction between a client computing device and embodiments of the three-layer management protocol device emulator and method shown in FIG. 1.

FIG. 2 is a block diagram illustrating details of interaction between a client computing device 200 and embodiments of the three-layer management protocol device emulator 100 and method shown in FIG. 1. The client computing device 200 may be one of the clients shown in FIG. 1. The client computing device 200 contains a software product to be tested (box 210). As discussed above, the server computing device 110 and embodiments of the three-layer management protocol device emulator 100 and method communicate through the network 120. It should be noted that the three-layer multiple-endpoint model based emulator is built on a single logic unit of the server computing device 110 (such that the server computing device 110 is the host machine of the logic unit). In other words, it is possible for the server computing device 110 to have multiple logic units, but embodiments of the system 100 and method resided on a single logic unit on the server computing device 110. The single logic unit refers to one virtual machine or a one operating system running on the physical machine, which in this case is the server computing device 110. The single logic unit can be a virtual machine hosting on a computer that has several virtual machines running on it. Alternatively, the logic unit can be defined as one operating system running on physical machine. Moreover, any computing devices connecting and accessing the server computing device 110 will be referred to as a client computing device 200.

FIG. 2 also illustrates additional details of embodiments of the three-layer management protocol device emulator 100 and method. In particular, the three-layer multiple-endpoint model includes a proxy layer 220, a presentation layer 230, and a logic layer 240. Embodiments of the proxy layer 220 serve as an interface between embodiments of the three-layer management protocol device emulator 100 and method and the client computing device 200. In particular, embodiments of the proxy layer 220 emulate multiple devices using multiple addresses. In some embodiments this is achieved for each instance of a device by using an Internet Protocol (IP) address pool, a Fully Qualified Domain Name (FQDN) pool (or called as a Domain Name System (DNS) name entry, and a listening model. But each IP address and FQDN represent a single instance of a device. This makes it seem the clients on the network that there are a large number of devices available on the network.

Embodiments of the presentation layer 230 are used to parse the Web management protocol. Embodiments of the logic layer 240 represent logic for specific Web management protocol device. Embodiments of the three-layer management protocol device emulator 100 and method can emulate any other Web management protocol-compatible device by plugging in a new embodiment of the logic layer 240 without modifying embodiments of the proxy layer 220 and presentation layer 230.

II. Operational Overview

Figure 3:
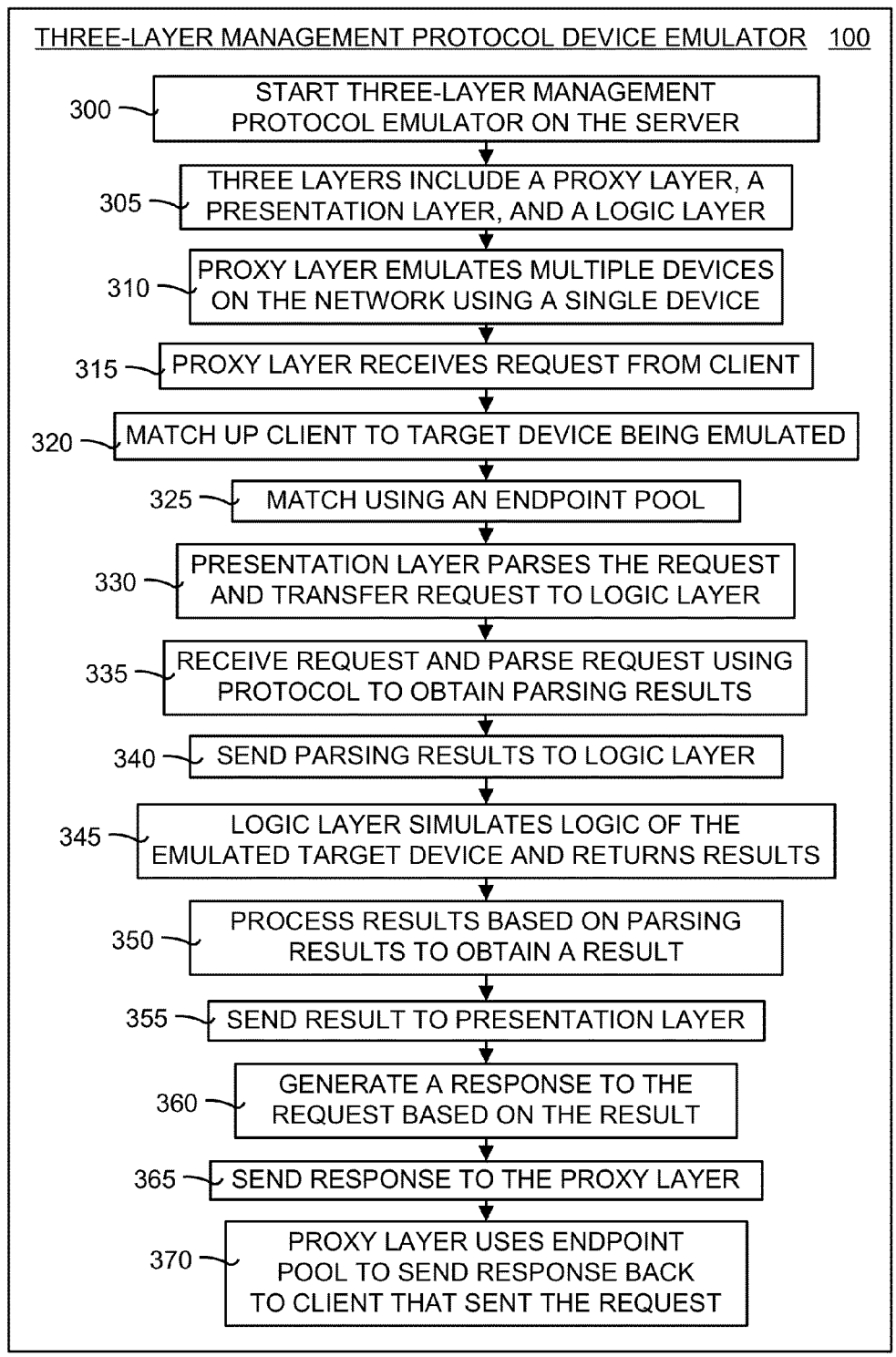
FIG. 3 is a flow diagram illustrating the general operation of embodiments of the three-layer management protocol device emulator shown in FIGS. 1 and 2.

FIG. 3 is a flow diagram illustrating the general operation of embodiments of the three-layer management protocol device emulator 100 shown in FIGS. 1 and 2. In general, embodiments of the three-layer management protocol device emulation method emulate multiple instances of Web management protocol devices by using a single emulator. Referring to FIG. 3, the method begins by starting an embodiment of the three-layer management protocol device emulator 100 on the server computing device 110 (box 300). The three layers include the proxy layer 220, the presentation layer 230, and the logic layer 240 (box 305).

Embodiments of the proxy layer 220 emulate multiple devices on the network (box 310). This involves registering multiple DNS, IP addresses, and so forth, and listening and responding to any requests to these resources. In particular, embodiments of the proxy layer 220 receive a request from a client computing device (box 315). The request is directed at one of the many devices that is being emulated by embodiments of the three-layer management protocol device emulator 100. This request is processed by embodiments of the proxy layer 220 in order to match up the requesting client with the target device being emulated (box 320). This matching is performed using an endpoint pool containing IP addresses and host names (box 325).

Embodiments of the presentation layer 230 parse the request and transfer to this information to embodiments of the logic layer 240 (box 330). More specifically, embodiments of the presentation layer 230 receive the request and then parse the request using the Web management protocol to obtain parsing results (box 335). The parsing results then are sent to embodiments of the logic layer 240 (box 340).

Embodiments of the logic layer 240 simulate the logic of the target device and return the results (box 345). In particular, embodiments of the logic layer 240 process the request based on the parsing results to obtain a result (box 350). This result then is sent to embodiments of the presentation layer 230 (box 355). Embodiments of the presentation layer 230 then generate a response to the request based on the result (box 360), and the response is sent to embodiments of the proxy layer 220 (box 365). Embodiments of the proxy layer 220 use the endpoint pool to send the response back to the client that sent the request (box 370).

III. System and Operational Details

The system and the operational details of embodiments of the three-layer management protocol device emulator 100 and method now will be discussed. These embodiments include embodiments of the proxy layer 220, the presentation layer 230, and the logic layer 240. The system and operational details of each of these modules now will be discussed in detail.

III.A. Proxy Layer

Embodiments of the proxy layer 220 are the bottom layer of the three-layer multiple-endpoint model used by embodiments of the three-layer management protocol emulator 100 and method. In general, embodiments of the proxy layer 200 expose a web service to any Web management protocol client (such as WS-Management client) that connects to embodiments of the proxy layer 220. More specifically, embodiments of the proxy layer 220 have two major functions. First, embodiments of the proxy layer 220 simulate multiple instances on a single logic unit. This means that embodiments of the proxy layer 220 bind multiple endpoints to the logic unit on the server computing device 110 such that those multiple endpoints are associated with and can be found on the server computing device 110. Each of the multiple endpoints includes an IP address and a FQDN (or host name). The IP address and corresponding FQDN (or host name) represents one device instance. Usually, the client's request target an IP address or a FQDN, which represents the destination of that request. When the request is received by the proxy layer, the proxy layer determines which emulated device instance the request is going to by the IP address or by the FQDN (or host name). Embodiments of the proxy layer 220 make any Web management protocol client consider that every endpoint is an emulator instance on the network. Every endpoint includes one IP address & corresponding FQDN (or host name), and every endpoint then represents one emulated device instance.

Second, embodiments of the proxy layer 220 redirect Web management protocol requests from any endpoint to the presentation layer 230. Again, each endpoint represents one instance on the network of an emulated device. Embodiments of the proxy layer 220 also send Web management protocol responses to Web management protocol client through an endpoint from where the request was received.

Figure 4:
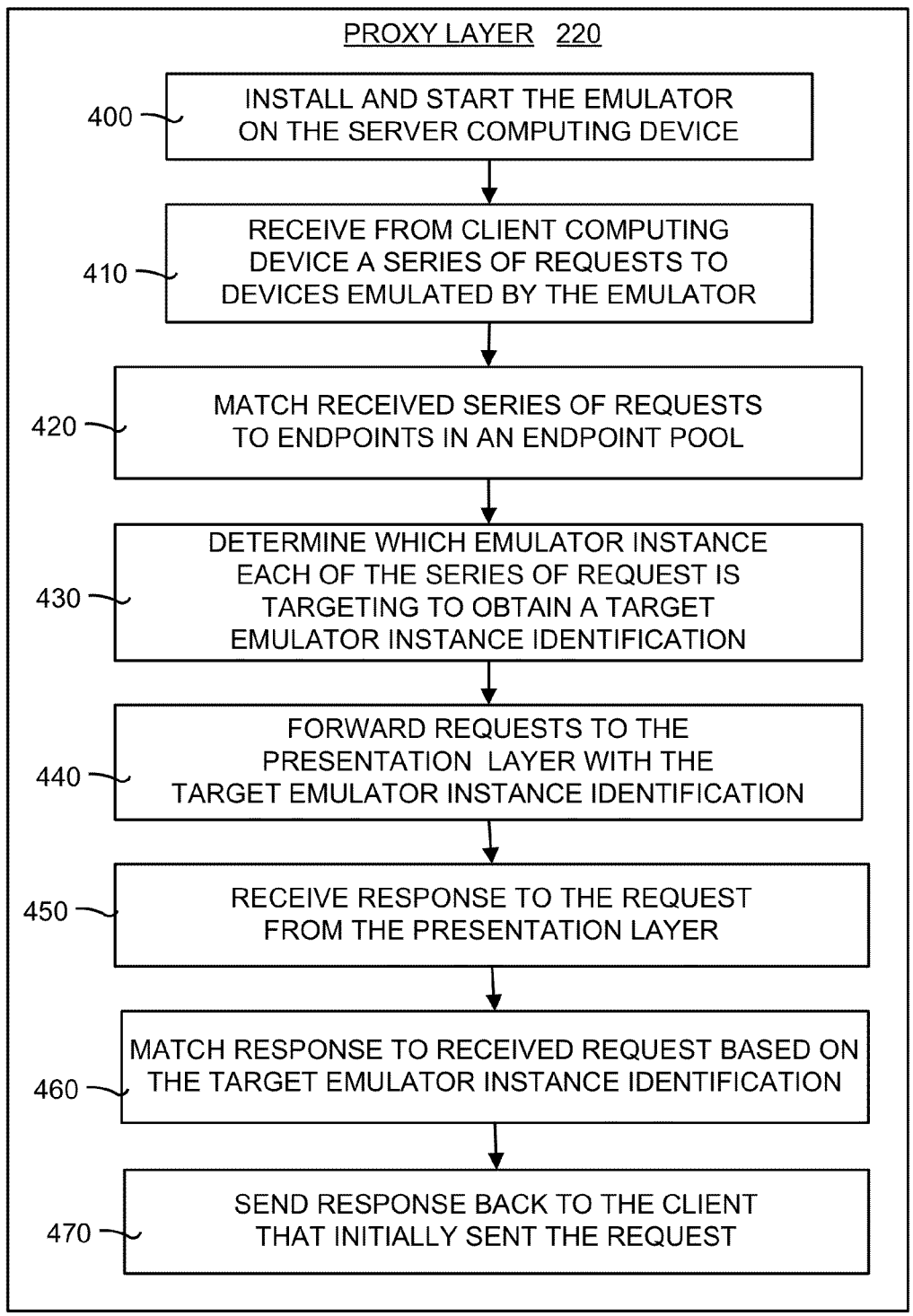
FIG. 4 is a flow diagram illustrating the operational details of embodiments of the proxy layer shown in FIG. 2.

FIG. 4 is a flow diagram illustrating the operational details of embodiments of the proxy layer 220 shown in FIG. 2. The operation begins by installing and starting embodiments of the emulator 100 on the server computing device 110 (box 400). Once embodiments of the emulator 100 are installed, embodiments of the proxy layer 220 receive from the client computing device one or more requests (box 410). Each request in this series of requests is directed to a device that can be emulated by embodiments of the emulator 100.

Each request in the series of requests then is matched to one of the multiple endpoints contained in an endpoint pool (box 420). In other words, proxy layer 220 matches the request by using an endpoint's IP address or FQDN (host name), The request is matched to an endpoint from the endpoint pool using the IP address that pairs to a corresponding FQDN, which is resolvable in DNS system. Embodiments of the proxy layer 220 then determine which of the multiple devices that embodiments of the emulator 100 can emulate are the target of the request (box 430). The target of the request is called the emulator instance, and a target emulator instance identification is assigned to each request. Embodiments of the proxy layer 220 then forward each request to the presentation layer 230 along with the target emulator instance identification (box 440).

The forwarded request then is processed by embodiments of the presentation layer 230 and the logic layer 240. Embodiments of the proxy layer 220 then receive from the presentation layer 230 a response to each forwarded request (box 450). Embodiments of the proxy layer 220 then match each response to the forwarded request, which corresponds to the request that was initially received at the proxy layer from the client computing device (box 460). This matching is performed based each request's corresponding target emulator instance identification. Based on this matching, embodiments of the proxy layer 220 send a response back to the client computing device that initially sent the request (box 470).

Figure 5:
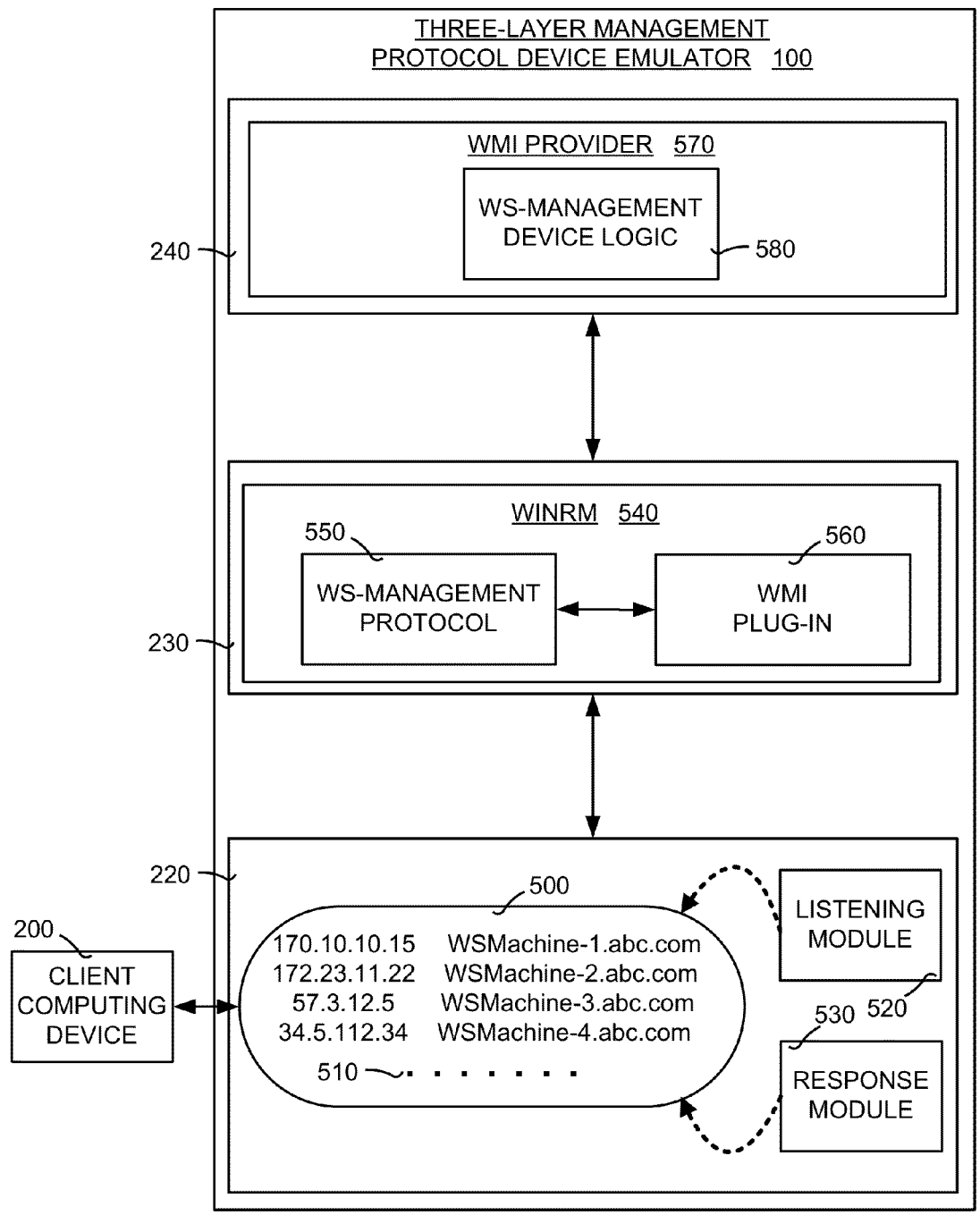
FIG. 5 is a block diagram illustrating details of an exemplary embodiment of the three-layer management protocol device emulator and method shown in FIGS. 1-3.

In order to simulate multiple instances of Web management protocol devices on network using a single logic unit on the server computing device 110, embodiments of the proxy layer 220 are multiple instances capable. Multiple instances allow the isolation of resources associated with a given instance. FIG. 5 is a block diagram illustrating details of an exemplary embodiment of the three-layer management protocol device emulator and method shown in FIGS. 1-3. Embodiments of the proxy layer 220 shown in FIG. 5 contain an endpoint pool 500. The endpoint pool 500 contains multiple pairs of IP addresses and host names, where each pair represents a single emulator instance. Each emulator instance has one IP address and a FQDN (or host name). The IP address and FQDN are pair and can be resolved to each other through DNS. By way of example, in FIG. 5 the endpoint pool 500 illustrates a pair having an IP address of "170.10.10.15" and a host name of "WSMachine-1.abc.com." This pair corresponds to a single emulator instance. The ellipses 510 denote that there can be more pairs in the endpoint pool 500 than are shown in FIG. 5. The IP address and host name will be registered to DNS, Dynamic Host Configuration Protocol (DHCP), WINDOWS® Internet Name Service (WINS) by MICROSOFT® Corporation of Redmond, Wash., and so forth. All of these IP address will be mapped to the identical Media Access Control (MAC) address associated with the logic unit on the server computing device 110. Thus, by way of example, when a WS-Management client connects to any instance with either an IP address or a host name, the request will be directed to the logic unit on the server computing device 110.

Referring again to FIG. 5, embodiments of the proxy layer 220 also include a listening module 520 that accepts incoming Web management protocol requests targeting any IP address or host name contained in the endpoint pool 500. Embodiments of the listening module 520 then forward these requests to the embodiments of the presentation layer 230. When a request is handled and a response is returned by embodiments of the presentation layer 230, a response module 530 identifies the IP address that the request originally targeted. Embodiments of the response module 530 then send the response to the client computing device using the corresponding IP address or host name.

In the exemplary embodiment shown in FIG. 5 the three-layer management protocol device emulator 100 emulates multiple WS-Management devices and is based on the three-layer multiple-endpoints model. The proxy layer is 220 is implemented independently which binds multiple endpoints. When the WS-Management requests are received and are directed to these endpoints, the proxy layer 220 will process them and forward it to embodiments of the presentation layer 230.

In the embodiment of the presentation layer 230 shown in FIG. 5, WINDOWS® Remote Management (WinRM) 540 made by MICROSOFT® Corporation of Redmond, Wash., is used as the presentation layer 230. WinRM 540 understands the WS-Management protocol. Moreover, WinRM 540 parses the WS-Management request and passes that to the logic layer 240. WinRM 540 presentation layer 230 also contains a WS-Management protocol 550 and a WINDOWS® Management Infrastructure (WMI) plug-in 560. WMI is made by MICROSOFT® Corporation of Redmond, Wash. WinRM 540 also assembles the WS-Management response using the results provided by the logic layer 240.

The logic layer 240 is implemented based on a WMI provider 570. The WMI provider 570 contains the logic portion of the emulated device. In particular, as shown in FIG. 5, the WMI provider 570 contains a WS-Management device logic 580. The WMI provider 570 processes the request and then returns the result to the WinRM 540. It should be noted that the exemplary embodiment shown in FIG. 5 and the services used therein may be replaced by any number of other types of similar services.

Figure 6:
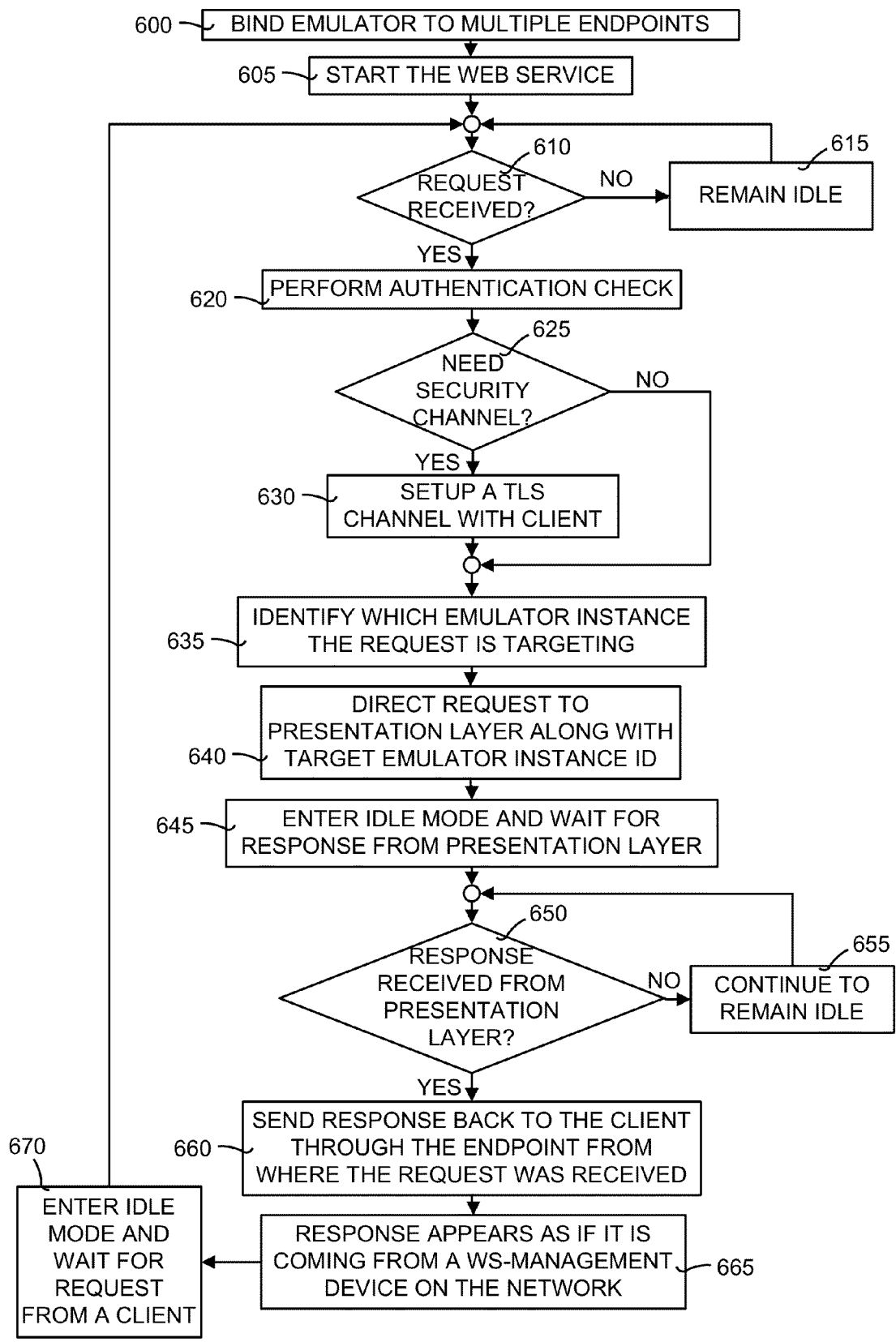
FIG. 6 is a flow diagram illustrating a detailed operation of an exemplary embodiment of the proxy layer shown in FIGS. 2, 4, and 5.

FIG. 6 is a flow diagram illustrating a detailed operation of an exemplary embodiment of the proxy layer 220 shown in FIGS. 2, 4, and 5. The operation of this exemplary embodiment begins by binding embodiments of the emulator 100 to multiple endpoints (box 600). This is achieved by having embodiments of the proxy layer 220 allocate multiple IP addresses and host names in its endpoint pool and register them to DHCP, DNS, Wins, and so forth. Next, the exemplary embodiment of the proxy layer 220 starts the web service to listen from any WS-Management request (box 605). A determination then is made as to whether a WS-Management request has been received (box 610). If not, then the exemplary embodiment of the proxy layer 220 remains idle until it gets any WS-Management request (box 615).

When a request is received the exemplary embodiment of the proxy layer 220 checks the authentication provided by the WS-Management client (box 620). A determination then is made as to whether the WS-Management client needs a security channel (box 625). If so, then in some embodiments a Transport Layer Security (TLS) channel is setup with a WS-Management client (box 630). If not, then the TLS channel setup is skipped.

Next, the exemplary embodiment of the proxy layer 220 identifies which emulator instance the request is targeting (box 635). In some embodiments this is achieved by obtaining the Hypertext Transfer Protocol (HTTP) or HTTP Secure (HTTPS) data. Then exemplary embodiments of the proxy layer 220 direct the request to embodiments of the presentation layer 230 along with a target emulator instance identification (box 640).

The exemplary embodiment of the proxy layer 220 then enters an idle mode (box 645) and waits for response from the embodiments of the presentation layer 230. Specifically, a determination is made as to whether a response has been received from the presentation layer 230 (box 650). If a response has not been received then the exemplary embodiment of the proxy layer 220 continues in an idle mode (box 655). Otherwise, when the response is received from embodiments of the presentation layer 230, the exemplary embodiment of the proxy layer 220 sends the response back to the client. This response is sent back to the client by the proxy layer 220 using the endpoint that corresponds to the emulated device originally targeted by the request (box 660). By doing this, it makes the response seems like sent from a WS-Management device on network (box 665). An idle mode then is entered and the exemplary embodiment of the proxy layer 220 waits for another request from a client on the network (box 670).

III.B. Presentation Layer

Embodiments of the presentation layer 230 are the middle layer of the three-layer multiple-endpoint model. One function of this layer is to understand the Web management protocol and to perform translation for the other two layers. In general, embodiments of the presentation layer 230 parse a Web management protocol request and send it to the correct location in embodiments of the logic layer 240. Embodiments of the presentation layer 230 also assemble a Web management protocol response package containing results from embodiments of the logic layer 240 and forward it to embodiments of the proxy layer 220.

Figure 7:
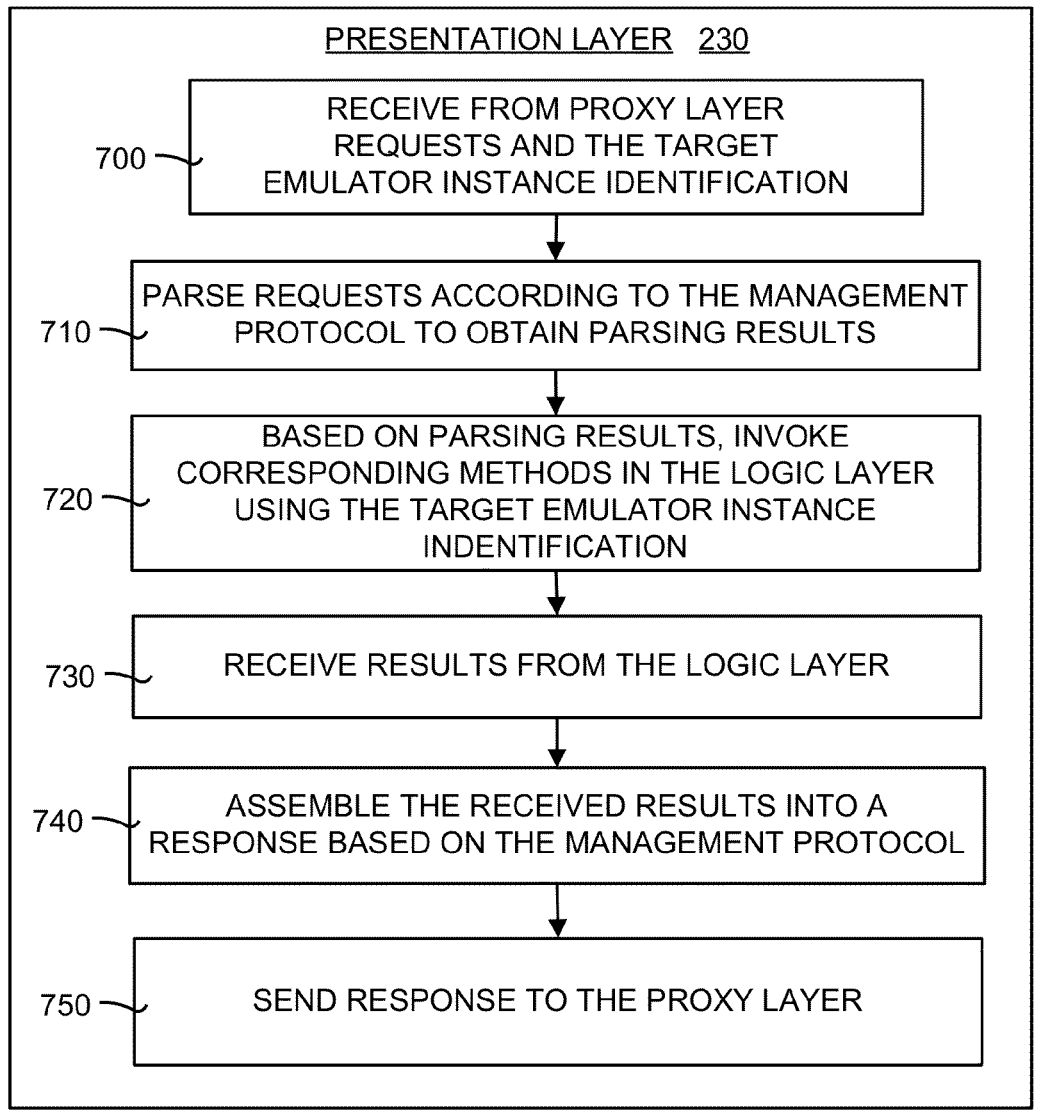
FIG. 7 is a flow diagram illustrating the operational details of embodiments of the presentation layer shown in FIGS. 2 and 5.

FIG. 7 is a flow diagram illustrating the operational details of embodiments of the presentation layer 230 shown in FIGS. 2 and 5. The operation begins by receiving from embodiments of the proxy layer 220 a request sent by a client along with the target emulator instance identification associated with the request (box 700). Next, the results are parsed according to the Web management protocol in order to obtain parsing results (box 710). Parsing means that the presentation layer 230 reads the request in the format of the Web management protocol, unpacks it according to the protocol, and understands the data contained in the request. Based on the parsing results, embodiments of the presentation layer 230 invoke corresponding methods in embodiments of the logic layer 240 by using the target emulator instance identification (box 720). This passes the request on to embodiments of the logic layer 240 for processing.

Once embodiments of the logic layer 240 have completed processing, embodiments of the presentation layer 230 receives results from embodiments of the logic layer 240 (box 730). These received results are assembled by embodiments of the presentation layer 230 into a response based on the Web management protocol (box 740). This response then is sent to embodiments of the proxy layer 220 (box 750).

III.C. Logic Layer

Embodiments of the logic layer 240 are the top of the three-layer multiple-endpoint model. Embodiments of the logic layer 240 are fulfilled by the simulated device's logic. In addition, embodiments of the logic layer 240 maintain an exclusive copy of metadata for every emulator instance. In some embodiments this metadata includes configuration, status and data.

Figure 8:
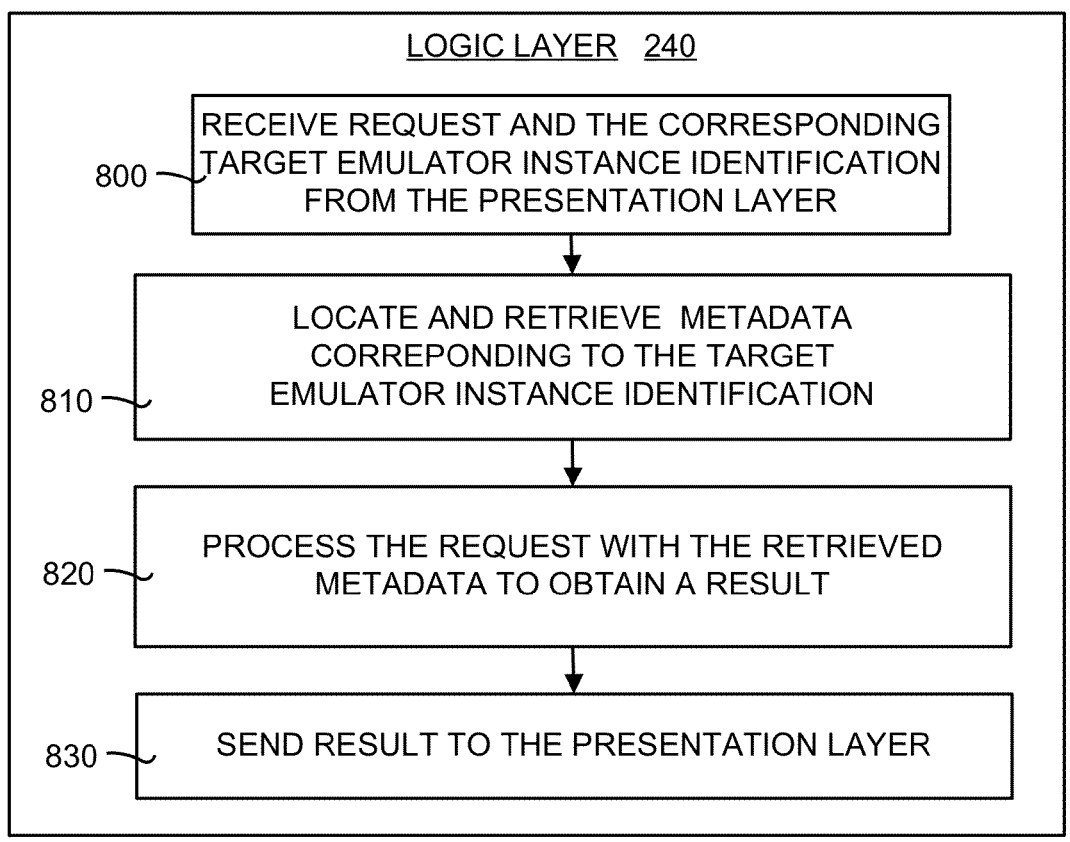
FIG. 8 is a flow diagram illustrating the operational details of embodiments of the logic layer shown in FIGS. 2 and 5.

FIG. 8 is a flow diagram illustrating the operational details of embodiments of the logic layer 240 shown in FIGS. 2 and 5. The operation begins by receiving a request and the corresponding target emulator instance identification from embodiments of the presentation layer (box 800). Once it accepts the request from embodiments of the presentation layer 230, embodiments of the logic layer 240 locate and retrieve metadata corresponding to the target emulator instance identification (box 810). In particular, the data of a specific emulator instance is located and retrieved. Next, the request is processed using the retrieved metadata to obtain a result (box 820). Embodiments of the logic layer 240 then send or return the result to embodiments of the presentation layer 230 (box 830).

One benefit from the three-layer multiple endpoint model is that embodiments of the logic layer 240 are independent from the Web management protocol. Embodiments of the logic layer 240 only need to focus on a Web management protocol device's specific logic and functionality. Embodiments of the logic layer 240 also manage every copy of metadata for each emulator instance. This means that every for every emulator instance the logic unit of the server computing device 110 is able to maintain its own data and status. Therefore, every emulator instance is an independent unit. With this approach a single logic unit on the server computing device 110 can behave as if it were multiple Web management protocol devices on the network.

IV. Exemplary Operating Environment

Embodiments of the three-layer management protocol device emulator 100 and method are designed to operate in a computing environment. The following discussion is intended to provide a brief, general description of a suitable computing environment in which embodiments of the three-layer management protocol device emulator 100 and method may be implemented.

Figure 9:
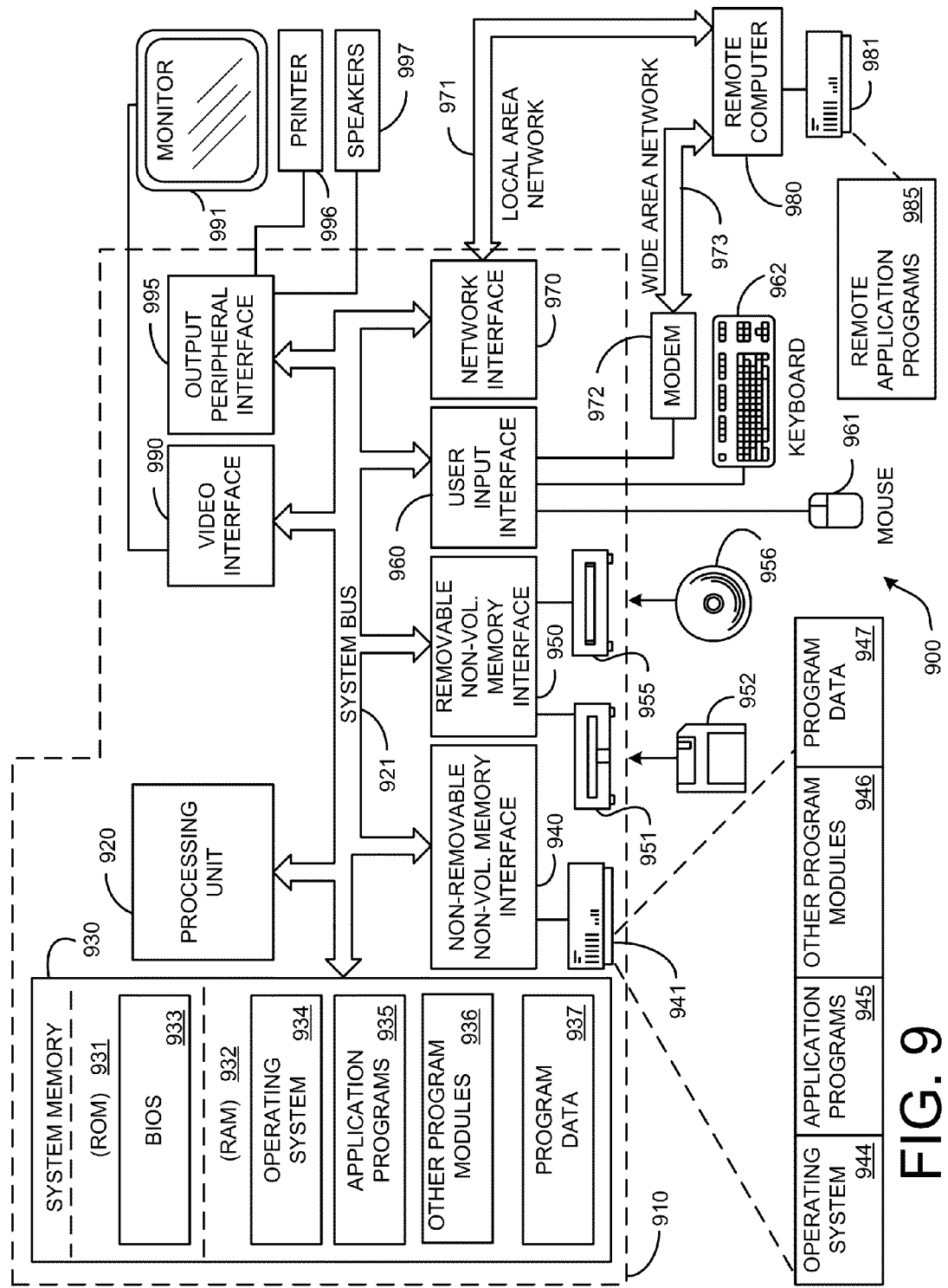
FIG. 9 illustrates an example of a suitable computing system environment in which embodiments of the three-layer management protocol device emulator and method shown in FIGS. 1-8 may be implemented.

FIG. 9 illustrates an example of a suitable computing system environment in which embodiments of the three-layer management protocol device emulator 100 and method shown in FIGS. 1-8 may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment.

Embodiments of the three-layer management protocol device emulator 100 and method are operational with numerous other general purpose or special purpose computing system environments or configurations. Examples of well known computing systems, environments, and/or configurations that may be suitable for use with embodiments of the three-layer management protocol device emulator 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the three-layer management protocol device emulator 100 and method may be described in the general context of computer-executable instructions, such as program modules, being executed by a computer. Generally, program modules include routines, programs, objects, components, data structures, etc., that perform particular tasks or implement particular abstract data types. Embodiments of the three-layer management protocol device emulator 100 and method may also be practiced in distributed computing environments where tasks are performed by remote processing devices that are linked through a communications network. In a distributed computing environment, program modules may be located in both local and remote computer storage media including memory storage devices. With reference to FIG. 9, an exemplary system for embodiments of the three-layer management protocol device emulator 100 and method includes a general-purpose computing device in the form of a computer 910.

Components of the computer 910 may include, but are not limited to, a processing unit 920 (such as a central processing unit, CPU), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer readable media. Computer readable media can be any available media that can be accessed by the computer 910 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 910. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within the computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information (or data) into the computer 910 through input devices such as a keyboard 962, pointing device 961, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 920 through a user input interface 960 that is coupled to the system bus 921, but may be connected by other interface and bus structures, such as, for example, a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A computer-implemented method for emulating a plurality of Web Services-Management devices on a computer network, comprising:

starting a three-layer management protocol device emulator on a server connected to the computer network, the three-layer management protocol device emulator having a proxy layer, a presentation layer, and a logic layer that is independent of the Web Services-Management protocol;

receiving a request from a client on the computer network intended for different ones of the plurality of Web Services-Management devices;

matching up the request from the client to each of the different ones of the plurality of Web Services-Management devices using an endpoint pool contained on the proxy layer to obtain a target emulator instance identification for each of the plurality of plurality of Web Services-Management devices;

sending the request and target emulator instance identification to the presentation layer;

parsing the request on the presentation layer using the target emulator instance identification to obtain parsing results;

sending the parsing results from the presentation layer to the logic layer;

processing the parsing results on the logic layer to obtain a result;

sending the result from the logic layer to the presentation layer;

generating a response to the request on the presentation layer using the result;

sending the response to the proxy layer;

using the endpoint pool on the proxy layer to send the response back over the computer network to the client that sent the request such that it appears to the client that the response is coming from one of the plurality of Web Services-Management devices on the computer network and not the server; and plugging in a new version of the logic layer to emulate other Web Services-Management devices without modifying the proxy layer or the presentation layer.

2. The computer-implemented method of claim 1, further comprising:

performing an authentication check on the proxy layer to determine whether the client needs a security channel; and if the client does need a security channel, then setting up a security channel with the client on the proxy layer.

3. The computer-implemented method of claim 2, further comprising:

identifying which of the plurality of Web Services-Management devices the request is targeting using the target emulator instance identification.

4. The computer-implemented method of claim 3, further comprising parsing the request according to the Web Services-Management protocol to obtain the parsing results.

5. The computer-implemented method of claim 4, further comprising invoking corresponding methods in the logic layer based on the parsing results to obtain the result.

6. The computer-implemented method of claim 5, further comprising:

locating and retrieving metadata on the logic layer corresponding to the target emulator instance identification; and processing the request with the retrieved metadata to obtain the result.

7. The computer-implemented method of claim 6, further comprising assembling the result on the presentation layer into the response based on the Web Services-Management protocol.

8. A computer storage memory having computer-executable instructions for causing a computer to perform steps comprising:
   starting a three-layer management protocol device emulator on a server connected to a computer network, the three-layer management protocol device emulator having a proxy layer, a presentation layer, and a logic layer that is independent of the Web Services-Management protocol;
   receiving a request from a client on the computer network intended for different ones of the plurality of Web Services-Management devices;
   matching up the request from the client to each of the different ones of the plurality of Web Services-Management devices using an endpoint pool contained on the proxy layer to obtain a target emulator instance identification for each of the plurality of plurality of Web Services-Management devices;
   sending the request and target emulator instance identification to the presentation layer;
   parsing the request on the presentation layer using the target emulator instance identification to obtain parsing results;
   sending the parsing results from the presentation layer to the logic layer;
   processing the parsing results on the logic layer to obtain a result;
   sending the result from the logic layer to the presentation layer;
   generating a response to the request on the presentation layer using the result;
   sending the response to the proxy layer;
   using the endpoint pool on the proxy layer to send the response back over the computer network to the client that sent the request such that it appears to the client that the response is coming from one of the plurality of Web Services-Management devices on the computer network and not the server; and
   plugging in a new version of the logic layer to emulate other Web Services-Management devices without modifying the proxy layer or the presentation layer.

9. The computer storage memory of claim 8, further comprising:
   performing an authentication check on the proxy layer to determine whether the client needs a security channel; and
   if the client does need a security channel, then setting up a security channel with the client on the proxy layer.

10. The computer storage memory of claim 9, further comprising:
    identifying which of the plurality of Web Services-Management devices the request is targeting using the target emulator instance identification.

11. The computer storage memory of claim 10, further comprising parsing the request according to the Web Services-Management protocol to obtain the parsing results.

12. The computer storage memory of claim 11, further comprising invoking corresponding methods in the logic layer based on the parsing results to obtain the result.

13. The computer storage memory of claim 12, further comprising:
    locating and retrieving metadata on the logic layer corresponding to the target emulator instance identification; and
    processing the request with the retrieved metadata to obtain the result.

14. The computer storage memory of claim 13, further comprising assembling the result on the presentation layer into the response based on the Web Services-Management protocol.

15. A system for emulating a plurality of Web Services-Management devices on a computer network comprising:
    a server computing device having a processing unit coupled to a memory, the memory storing computer-executable instructions to:
    start a three-layer management protocol device emulator on a server connected to the computer network, the three-layer management protocol device emulator having a proxy layer, a presentation layer, and a logic layer that is independent of the Web Services-Management protocol;
    receive a request from a client on the computer network intended for different ones of the plurality of Web Services-Management devices;
    match up the request from the client to each of the different ones of the plurality of Web Services-Management devices using an endpoint pool contained on the proxy layer to obtain a target emulator instance identification for each of the plurality of plurality of Web Services-Management devices;
    send the request and target emulator instance identification to the presentation layer;
    parse the request on the presentation layer using the target emulator instance identification to obtain parsing results;
    send the parsing results from the presentation layer to the logic layer;
    process the parsing results on the logic layer to obtain a result;
    send the result from the logic layer to the presentation layer;
    generate a response to the request on the presentation layer using the result;
    send the response to the proxy layer;
    use the endpoint pool on the proxy layer to send the response back over the computer network to the client that sent the request such that it appears to the client that the response is coming from one of the plurality of Web Services-Management devices on the computer network and not the server; and
    plug in a new version of the logic layer to emulate other Web Services-Management devices without modifying the proxy layer or the presentation layer.

16. The system of claim 15, further comprising:
    performing an authentication check on the proxy layer to determine whether the client needs a security channel; and
    if the client does need a security channel, then setting up a security channel with the client on the proxy layer.

17. The system of claim 16, further comprising:
    identifying which of the plurality of Web Services-Management devices the request is targeting using the target emulator instance identification.

18. The system of claim 17, further comprising parsing the request according to the Web Services-Management protocol to obtain the parsing results.

19. The system of claim 18, further comprising invoking corresponding methods in the logic layer based on the parsing results to obtain the result.

20. The system of claim 19, further comprising:
- locating and retrieving metadata on the logic layer corresponding to the target emulator instance identification; and
- processing the request with the retrieved metadata to obtain the result.

* * * * *